Dec. 19, 1967   P. KOSAR ET AL   3,358,838
OIL SKIMMING DEVICE
Filed June 11, 1965   6 Sheets-Sheet 1

INVENTORS
ORLAN M. ARNOLD
PETER KOSAR
BY
ATTORNEYS

Dec. 19, 1967 P. KOSAR ET AL 3,358,838
OIL SKIMMING DEVICE
Filed June 11, 1965 6 Sheets-Sheet 2

INVENTORS
ORBAN M. ARNOLD
PETER KOSAR
BY Curtis, Morris & Safford
ATTORNEYS Dec. 19, 1967  P. KOSAR ET AL  3,358,838
OIL SKIMMING DEVICE Filed June 11, 1965  6 Sheets-Sheet 3

INVENTORS
ORLAN M. ARNOLD
PETER KOSAR
BY Curtis Morris
ATTORNEYS

Dec. 19, 1967  P. KOSAR ET AL  3,358,838
OIL SKIMMING DEVICE

Filed June 11, 1965  6 Sheets-Sheet 6

INVENTORS
ORLAN M. ARNOLD
PETER KOSAR
BY Curtis, Morris & Safford
ATTORNEYS

United States Patent Office 3,358,838
Patented Dec. 19, 1967

3,358,838
OIL SKIMMING DEVICE
Peter Kosar, Garden City, and Orlan McGrew Arnold, Grosse Pointe Park, Mich., assignors to Ajem Laboratories, Inc., Livonia, Mich.
Filed June 11, 1965, Ser. No. 463,078
14 Claims. (Cl. 210—179)

ABSTRACT OF THE DISCLOSURE

Apparatus for separating a constituent from a liquid mixture with a rotor dipping into a body of the mixture and having a surface on the immersed part which is adapted preferentially to adsorb said constituent. Advantageously, the adsorbed liquid is scraped off from the rotor and flowed into another reservoir where it is again subjected to a rotor with preferential adsorption. This separation apparatus may have a number of additional similar separation stages in series. Heaters and electrostatic or electromagnetic attraction devices may be combined with the adsorption apparatus to increase efficiency of or extend the range of separation.

---

This invention relates to apparatus for separating liquids in industrial processing baths. More particularly, the invention relates to apparatus for removing liquids of substantially different polar properties by selective adsorption of one of the liquids on a continuously rotating surface having polar properties similar to those of the liquid being adsorbed thereon and subsequent removal of the adsorbed liquid from the rotating surface. This is a continuation-in-part of our corresponding copending application Ser. No. 452,282, filed Apr. 30, 1965.

During industrial machining operations, lubricating oils necessarily come in contact with the parts being machined. A considerable amount of this oil remains on the surface of the machined parts or chips and is carried with them to subsequent operations. The economic and efficient removal of this oil is an important problem. The problem is manifest in such equipment as industrial washers wherein machined parts are subjected to washing action for the purpose of removing "tramp" metal, chips, dirt, etc., by heavy washing action.

The washing solutions applied to the parts in these washers usually contain a detergent washing solution. However, even with effective emulsification of the oil in the washing solution, the effectiveness of the wash is materially reduced by oil left on the washed parts. In many washing operations the quality of oil increases as the operation proceeds and sometimes reaches a quantity totaling one-half of the volume of liquid within the equipment.

When large quantities of oil are present in, for example, a washer apparatus, oil segregates out of the wash solution and floats on the surface. Because many coolant oils contain volatile hydrocarbons, serious fire hazards may occur and whole areas of industrial plants must be subjected to special precautions against their ignition; moreover, the fumes may constitute a nuisance and health hazard.

Another serious problem caused by the accumulation of emulsified oil in such equipment as industrial power washers is the disposal of such washing fluids. Increasing municipal and state regulations tend to limit drastically the amount of foreign materials that may be discharged into streams, etc. Thus, the presence of large quantities of oil in industrial wash liquids may require that the entire volume of liquid be given separate and special treatment before being discharged into bodies of water protected by antipollution regulations. The removal of the major quantity of the foreign material often renders the liquid acceptable for discharge into such protected streams.

Furthermore, in some cases, the recovery of such oils yields a valuable material that can be reused in a plant operation, and thereby saves the cost of new material for that operation.

The usual methods of separating oils from aqueous and other polar liquids have a number of disadvantages to the industrial user. For example, the use of an overflow pipe or weir to skim off oil is restricted to equipment where a constant level of the substrate liquid can be maintained. In many types of apparatus the over-all liquid level rises and drops irregularly because of the non-uniformity of supply to the apparatus; or large quantities of oil may build up in such equipment far below the level of any overflow pipe or weir.

Belt-type removal devices such as have been described and claimed in a commonly owned and copending application, Ser. No. 367,437, filed May 15, 1964, have important advantages over the weir-type equipment. However, it has been found that after a time, belts require maintenance or replacement. Such belts need to fit the edge of a wiper blade for clean removal of oil from the belt and also the belt must track properly on the rolls or guide surfaces on which it is carried. Moreover, belt-type of apparatus as known to the art does not readily lend itself to cooling or heating as required for some industrial processes.

It is an object of the invention to provide an economical and efficient separator for separating liquids of different polar characteristics.

Another object of the invention is to provide a liquid separator having relatively high capacity.

Another object of the invention is to provide a separator for separating oil from water and also useful for separating metallic chips from liquid media.

It is a further object of the invention to provide a liquid-separating apparatus whereon the hydrophobic liquid is collected on a moving surface from which it is easily removed and collected.

It is also an object of the invention to increase the efficiency of liquid separating apparatus by temperature control.

Another object of the invention is to provide liquid separating apparatus advantageously maintained at an elevation above the liquid level of any major mass of liquid mixture being treated.

Still another object of the invention is to provide such liquid separating apparatus which is compact.

Another object of the invention is to provide apparatus for continuously removing liquid separated from a mixture.

A still further object of the invention is to provide for removing magnetic materials from liquid.

Other objects of the invention will be obvious from the description following.

The apparatus of the invention adapted to achieve these objects may comprise a rotatably mounted element having a surface at least partially submerged in a liquid mixture and means for removing from said element a constituent of the liquid which preferentially wets and is carried by said surface. Ordinarily this removal is effected from a non-submerged portion of the surface, but it may be sucked off the surface by a suction cleaner even while submerged.

Use of a dimensionally stable rotatable structure, e.g., a disk, with a selectively adsorbent surface requires less room than does use of belt-type apparatus such as that described in the application, Ser. No. 367,437, filed May 14, 1964. Furthermore, use of belt-type apparatus usually requires a plurality of pulleys or other rotating supports.

The structures which provide the rotatably mounted adsorbent surfaces may be simple disks or wheels, the forms and dimensions of which can vary substantially; other variations will be described below. Such structures may be of any convenient size and are, at least partially, immersed in the liquid mixture to be treated; advantageously the bottom third of the disk dips into the liquid.

Oil adhering to these rotating surfaces is carried up through the surface of the liquid mixture and removed from the rotating surface above the mass of liquid before it rotates again into the immersed position. Among the suitable forms for means of removal are squeegee-type scrapers, squeeze-type rollers, jets of air to blow the liquid from the adsorbent surface, etc.

The material of which the carrier surface is constructed is suitably of a polar character similar to that of the liquid which is to be preferentially adsorbed on said surface. For example, when oil is being removed from an aqueous material, the carrier surface may be of a material which has a low dielectric constant. In removing oily materials from water, for example, the adsorbing surface may conveniently be of a material having a dielectric constant less than about 5. Rubber and equivalent elastomers give a high rate of removal. Such materials as polytetrafluoroethylene and polyethylene with dielectric constant of about 2 and 2.3, respectively, are advantageously used. Neoprene and rubber disks, drums and the like may also be utilized. Furthermore, it has been found that metallic surfaces like steel, iron, copper, aluminum and non-metals like glass, acrylics, rubbers, etc., are useful, although it is best to rub oily coatings on the surfaces of the metal before immersing in the aqueous liquid. The surface character, whether smooth or grained, slightly roughened or grooved—and, if grooved, whether the grooves are helical or circumferential or straight, and their angular relation and depth—also contribute to the ability to pick up and carry a liquid to be separated.

When iron particles or other magnet responsive impurities are dispersed in the liquid mixtures, it is often advantageous to have magnets behind the adsorbent surface. A rotor with such magnets will pick up paramagnetic impurities such as iron dust, shavings and chips along with the oil. These impurities may then be removed before the adsorbent surface is again passed through the liquid.

For some applications with which the apparatus of the invention may be used, it is desirable to have a non-uniform adsorbing surface, e.g., a disk surface which is sufficiently rough or irregular so that the liquid-removing means, e.g., a squeege, does not quite completely remove the liquid. It is usually advantageous to leave a small amount of the liquid, which has been preferentially adsorbed onto the carrier surface, still coating the surface on its re-entry into the liquid reservoir because such a coated surface has the greatest possible compatibility with liquid still to be removed while repelling the ingredient of the liquid which is to be left.

Thus, peened, pebbled, grooved, ribbed and other surfaces with relatively shallow irregularities are especially advantageous. A screen or perforated sheet metal may be used with the advantage that material transferred thereon can be blown off more readily; but it is not necessary to have perforations in the disk. The disks may rotate as fast as 1000 r.p.m. or as slow as .001 r.p.m. or at a speed between, depending upon the thickness of the layer to be removed, the need for quiescence and the ratio of hydrophobic to hydrophilic liquids.

Other objects and distinctive features of the present invention not above referred to will appear from the following specification and claims and from the accompanying drawings wherein is shown a preferred embodiment thereof as described in this specification. The showing so made is not intended to be exhaustive of the subject invention. The purpose here is to illustrate the invention so that others skilled in the art may so fully understand it, its principles and applications, that they may embody it and adapt it in various forms respectively appropriate to the attainment of particular purposes in use.

Figure 1:
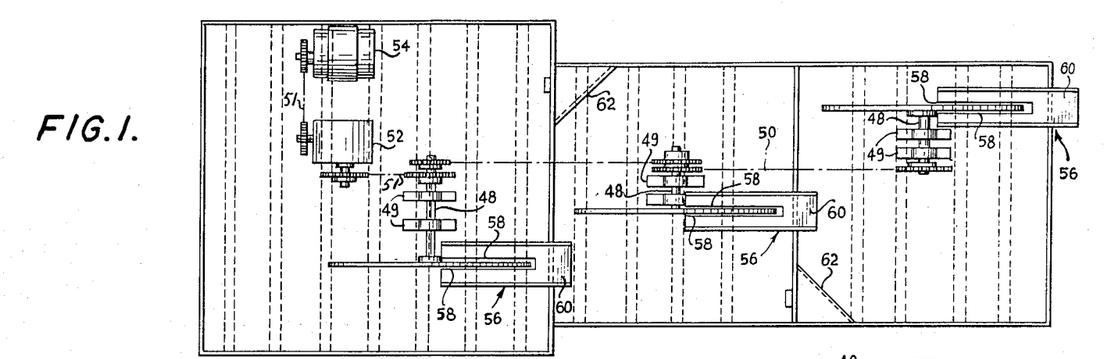
FIGURE 1 is a plan view of an apparatus of the invention which apparatus incorporates three skimming disks operating in series.
Figure 2:
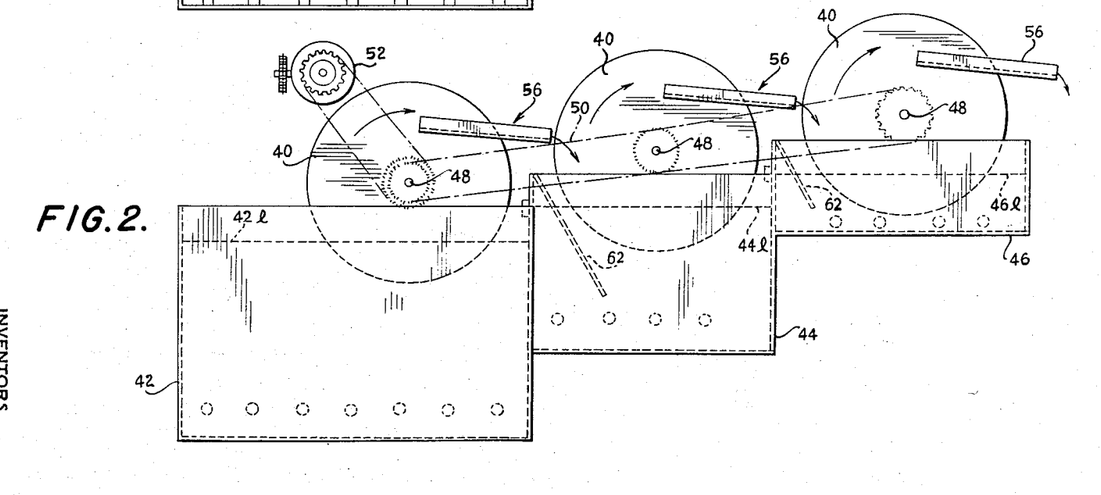
FIGURE 2 is a side elevation of the same.

Referring to one preferred embodiment illustrated in FIGURE 1, it is seen that disks 40 respectively are rotatably mounted in three progressively smaller reservoirs 42, 44 and 46. Each disk 40 is partially submerged, the liquid levels being indicated by 421, 441 and 461 on said reservoirs. Each disk 40 is rotatably mounted by a shaft 48 on bearings 49 secured to a disk frame and driven by sprocket chains 50–51, which operably connect speed reduced 52 which, in turn, connects to drive motor 54.

Mounted adjacent each disk 40 is a recovery assembly 56, which comprises a squeegee wiper or scraper blades 58, and a chute 60 for delivering the separated liquid.

Baffles 62 are mounted in reservoirs 44 and 46 to hold back the "creamed" oil-rich liquid near the top of the reservoir while the aqueous liquid is drawn off from behind the baffles.

In operation, reservoir 42 is filled with the dirty or mixed liquid to be separated into at least one relatively polar and one relatively non-polar liquid. Disks 40 are of polished steel, e.g., 1.94 ft. in diameter rotating at 6 r.p.m. or a circumferential speed of 36.42 feet per minute.

At this speed an initial removal rate of about 9 gallons per hour of a liquid having about 85% oil is achieved from a typical industrial waste liquid in reservoir 42, which comprised 2% by volume ASF No. 20 oil dispersed in water. A quantity of surfactant may also be present, as is common in industrial operations. The temperature of the mixture, for the example given was between 90 and 72° F., but this, like the other operating conditions, may vary substantially.

Heating the mixed liquid in the vicinity of 100° F. gave improved separation, but instead of raising all the liquid in the tank to such temperature we have preferred to heat the disk or the locality of removal, e.g., by radiant heat, which can be applied more or less intensively on the area near the disk, or by a heated trough or baffle or hot element over which the liquid flows to the vicinity of the disk or a hot convection fluid can be passed to that area.

The disk 40 preferentially adsorbs the oily phase of the liquid and repels the aqueous phase in the reservoir 42. The adsorbed oily liquid is carried on the disk to a scraper 58 which removes the liquid from disk 40 and allows it to flow into the second reservoir 44, so that reservoir 44 will contain a liquid more concentrated in the oil phase; and the temperature and disk speed may be adjusted different from those in 42, for a more efficient removal. A final removal and purification stage is provided by similarly separating the oily phase and flowing it on into reservoir 46.

It will be obvious to those skilled in the art that the rotational speed of the various disks 40 and the temperatures of each reservoir may be selected depending on whether the cleaning of a major constituent of the mixture or the isolation and purification of a minor constituent is desired. Furthermore, different conditions will be optimum for different mixtures.

FIGURES 3 through 11 show a number of forms of rotating disks which may be advantageous in different applications of the invention, and illustrate the breadth of choice which the invention permits.

Figure 3:
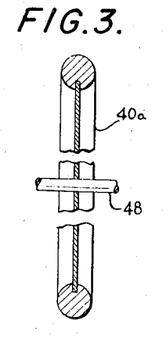
FIGURES 3–11 show in axial section various types of operable disks.
Figure 4:
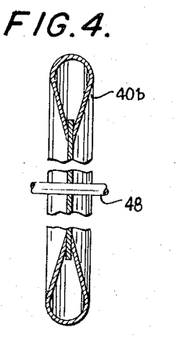
Figure 5:
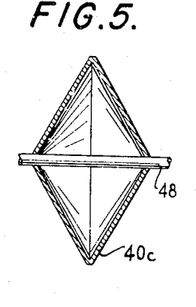
Figure 6:
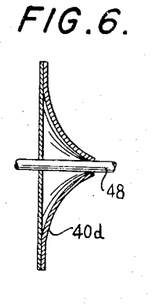
Figure 7:
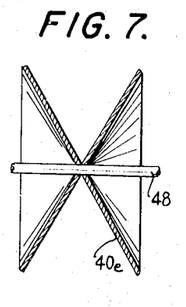
Figure 8:
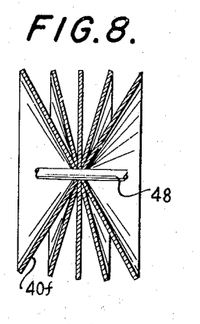

FIGURE 3 shows a disk 40a with a solid toroidal rim. The rim provides resistance to contrifugal or gravity flow of adsorbed liquid from the disk before it reaches a wiper. FIGURE 4 shows a similar disk 40b with a hollow rim more streamlined in cross-section.

FIGURES 5 through 11 show other embodiments of disks having larger surface areas and consequently providing means for removing larger volumes of liquid. However, these disks have other advantages; for example, disks 40c, 40d, 40e, 40f, 40g and 40h and 40i have surfaces which are other than vertical and thus will provide resistance to flow of liquid downward over the surfaces of the disks after emergence from the liquid dispersion and before scraping off the adherent liquid. Such disks are most useful with adherent liquids of very low viscosity or relatively high density.

Figures 9, 12:
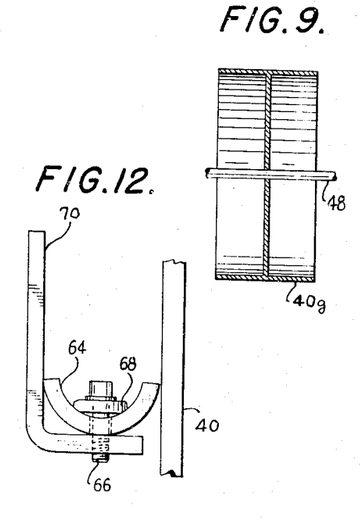
FIGURE 12 shows in elevation a fragmentary portion of the apparatus, particularly means for removing liquid from a rotating disk.
Figure 10:
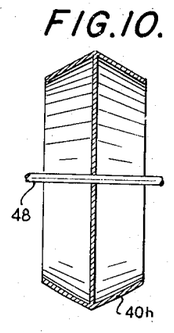
Figure 11:
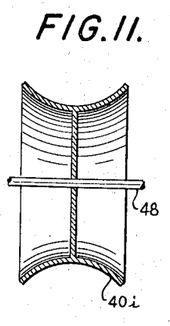

FIGURE 12 shows one advantageous squeegee scraper comprising an elastomeric blade 64, for example a half section of a rubber or plastic tube, locked in place by a screw 66 and presser plate 68 on bracket 70. The blade 64 contacts the disk 40 and scrapes off the adhering liquid. When wiper 64 becomes worn, it may be spread to make better contact with disk 40 by tightening down on screw 66. When such tightening is no longer sufficient because of wear, wiper 64 may be reversed so that the unworn side which had been adjacent bracket 70 is brought to bear against disk 40.

Figures 13, 14, 15, 16, 17:
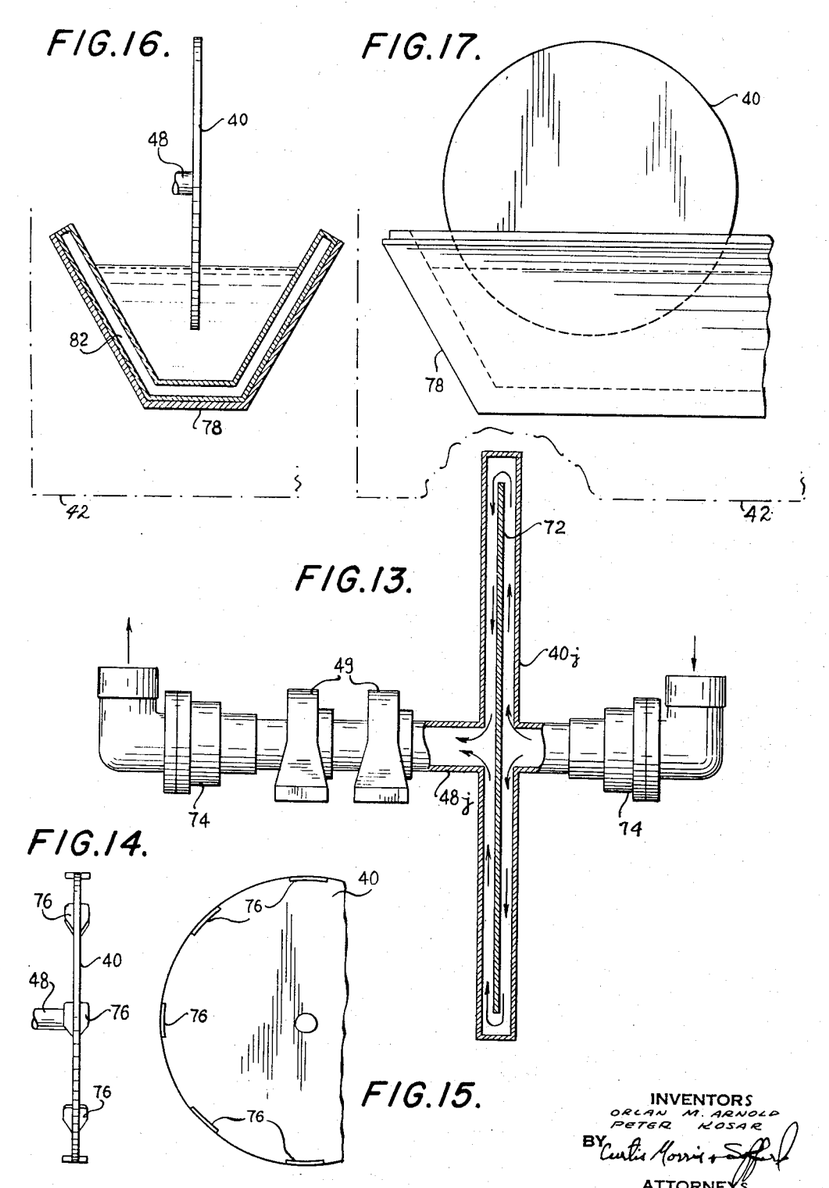
FIGURE 13 shows a schematic view, partly in axial section and partly in side elevation, of a rotating disk unit which may be heated and cooled as desired for optimum liquid separation.
FIGURE 14 is an edge view of an adsorbing disk which is equipped with cutting blades.
FIGURE 15 is a fragmentary side elevation of the disk shown in FIGURE 14.
FIGURE 16 is a view in cross-section showing a carrier disk mounted to rotate in an insulated inner tank or trough.
FIGURE 17 is a side elevation of the apparatus of FIGURE 16.

FIGURE 13 shows a disk 40j having an internal space or "jacket" for circulation of a temperature control liquid. Steam, or any other desirable heating or cooling media can enter hollow shaft 48j and be distributed, with the aid of baffle 72 throughout disk 40j. Rotation of disk 40j is made possible by use of gland couplings 74.

In FIGURES 14 and 15 cutters 76 are mounted on disk 40 at its periphery. These cutters 76 are advantageous, e.g. when foreign bodies (liquid or solid) are entrained or floating in the liquid mixture being treated. Especially advantageous is their use when iron chips or other solid material of small particle size is present in the dirty mixture because these particles can, with cut-up globules of grease, form paste-like residues which may be more easily removed by action of the cutter disks.

Magnetic disks are especially useful when cutters such as 76 are utilized, because of their attraction for such iron-contaminated paste agglomerations.

FIGURES 16 and 17 show a disk 40 in an inner tank 78 floating in a reservoir 42. Inner tank 78 is utilized most advantageously when it is desired to heat or cool a dirty liquid mixture; provision of tank 78 makes it unnecessary to heat the entire body of dirty mixture and provides means for isolating and heating only a small amount of liquid approaching disk 40.

Advantageously tank 78 is buoyant, e.g., by having a hollow section 82 of sufficient volume to support the apparatus. Alternatively tank 78 may be fabricated from some insulating and buoyant material such as polystyrene foam. Liquid from reservoir 42 flows into tank 78 through openings (not shown) in the latter tank, which are controlled by a float valve responsive to liquid level within the tank 78. Such openings advantageously are a little below the level in the reservoir 42, so that they give a "creaming" effect—removing the upper concentration of the liquid to be skimmed.

Advantageously, the liquid level is maintained so that about the bottom third of the disk is immersed in the liquid. This can be either by maintaining the liqud level, e.g., by floating the disk mechanism on pontoons or a hull as in FIGURES 16 to 17 and 20 to 25. The exact degree of immersion will vary with different conditions.

An advantage of floating apparatus such as that shown in FIGURES 16 to 17, 20 to 23, and 25 is that it permits use of the invention on large bodies of water, including ponds, lakes, waters along beaches, etc., for removal of scum, oil layers, etc.

Among the advantageous embodiments of the invention, for treating liquids containing ferrous or other paramagnetic material are those embodiments which comprise magnetic means in or on the disks 40. Not only do these magnets attract paramagnetic chips, etc., but when the chips become agglomerated with grease residues as mentioned above, they are readily attracted to the magnets on the disk and thereby removed from the liquid being cleaned.

Some advantageous structures providing such magnetic disks are shown in FIGURES 18, 19, and 27 through 29. In general the magnetic function may be provided by electromagnets or permanent magnets. These may be mounted on the surface of, or imbedded in, the rotating disk. Various magnets on the same surface, or on different rotating surfaces, can be placed in series or parallel relationship to one another to induce particularly high magnetic fields as is known to the art.

Figures 18, 19, 20, 21:
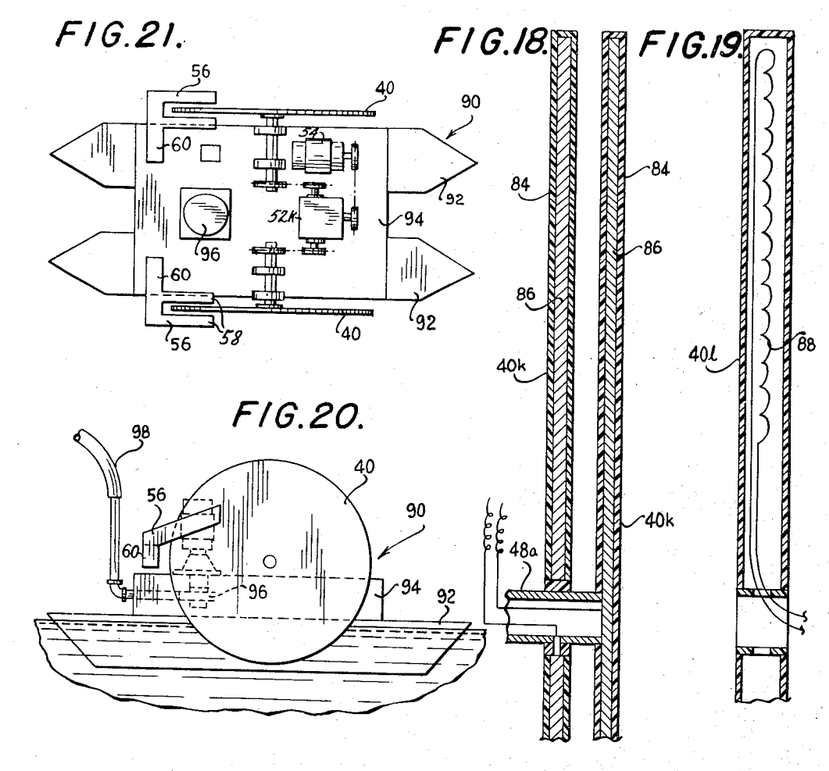
FIGURE 18 is a fragmentary axial section of a double disk designed to provide an electrostatic effect.
FIGURE 19 is a similar fragmentary axial section showing an electromagnetic device within the disk.
FIGURE 20 is a side elevation of another floating apparatus embodying the invention.
FIGURE 21 is a top view of the apparatus in FIGURE 20.

In FIGURE 18 disks 40k are designed for electrostatic or magnetic attraction. A plastic, e.g., elastomeric, insulating coat 84 covers polarized magnetic or statically charged material 86. The polarity is reversed in the two disks 40k so that they form a circuit with opposite polarity at adjacent points on the twin disks; thus paramagnetic or electrically charged materials, e.g., iron or steel chips are strongly attracted and held at the periphery of these disks, which carry them out of the liquid mixture.

When magnetic particles are dispersed in an oil and the dispersion is exposed to a strong magnetic field, the mixture exhibits a change of physical properties. Also the presence of the magnetic particles makes the mixture flow more effectively to the disk.

With some organic compounds electrostatic or magnetic orientation will produce a thixotropic effect.

To remove also particles and small bodies having an electrostatic charge, the cores 86 of the disks in FIGURE 18 may be connected by leads to a high voltage.

In FIGURE 19, a magnetic field is induced in disk 40$l$ by current flow in radially arranged, circumferentially spaced coils 88. The intensity of the field can be varied within practical limits by varying the current in coils 88. Any desired number of such radial electromagnets can be used in each disk.

FIGURES 20 and 21 show an embodiment of the invention wherein an apparatus having two disks 40 are buoyantly mounted on a floating barge 90 consisting of a hold tank 94 and pontoons 92. Two disks 40 are driven by a motor 54 through a speed reducer gear 52$k$. Oil adhering to the rotating disks is scraped off by, and carried on, blades 58 of assemblies 56 and flows down chute 60 to a hold tank 94, whence it is driven by pump 96 through flexible pipe line 98 (shown in FIGURE 20) to storage on shore or elsewhere.

Figure 22:
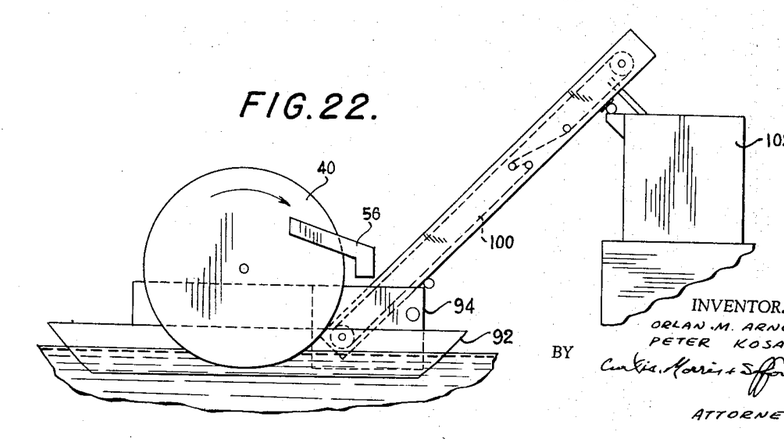
FIGURE 22 is a side elevational view of an apparatus embodying the invention, which apparatus is useful in large settling basins or natural ponds, etc.

FIGURE 22 schematically illustrates a floating assembly similar to that shown in FIGURES 20 and 21. The apparatus shown in FIGURE 22, however, has the additional advantage of obtaining a second separation step by utilizing, in series with the disk separator, a belt-type separator 100 similar to that shown in commonly owned and copending U.S. application Ser. No. 367,437, filed May 15, 1964. Separator 100 carries separated oil from hold tank 94 to tank 102 on the shore or elsewhere.

Figures 23, 24, 26:
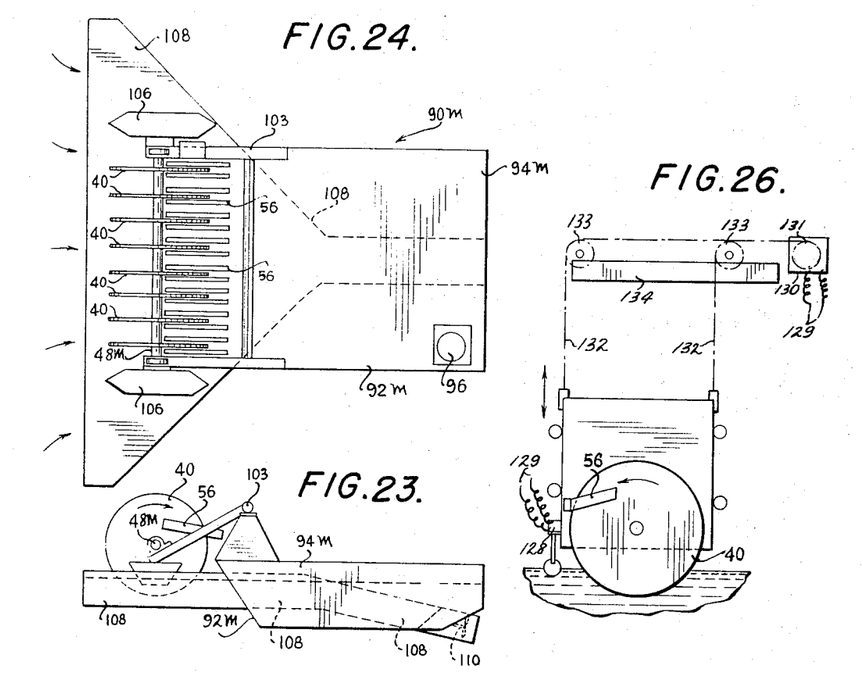
FIGURE 23 is a side elevation of an apparatus of the invention having a plurality of adsorbing disks and means for drawing liquid into proximity thereto.
FIGURE 24 is a top plan view of the apparatus of FIGURE 23.
FIGURE 26 is an elevation of an apparatus of the invention wherein the depth to which the adsorbing disk is submerged in the liquid being cleaned is automatically controlled.

FIGURES 24 and 23 show, in top and side elevation, still another apparatus of the instant invention comprising multiple rotating disks 40. These disks 40 are mounted on shaft 48$m$, which shaft is, in turn, pivotally mounted on barge 90$m$ and made buoyant by pontoons 92$m$. The apparatus is floated in the dirty or mixed liquid to be separated. A conduit 108 provides an open flow path, shovel (or funnel) shaped at its front, providing means for gathering into proximity to disks 40 a large part of the oil-rich surface layer of the mixed or dirty liquid. Conduit section 108 is entirely separate from hold tank 94, although it is shown as passing under it.

A propeller 110, shown in FIGURE 23, may serve two purposes on this apparatus. First it draws the raw liquid to disks 40 for the separation operation. Secondly, it propels the apparatus about the reservoir being cleaned. In larger reservoirs navigational control may be provided by radio signal or programmed control means. Of course, in smaller reservoirs, it is often more desirable to secure the apparatus in one place, and move the liquid past it, rather than to propel it around the reservoir.

The use of floats 106 on the shaft 48$m$ with the pivotal mounting at 103, assures the maintenance of the proper degree of submergence of disks 40 in the raw liquid.

A pump 96, schematically shown in FIGURE 24, is advantageously placed in tank 94$m$ and may be used to pump liquid collected from disks 40 to a process use, or to storage or waste, as desired.

Figure 25:
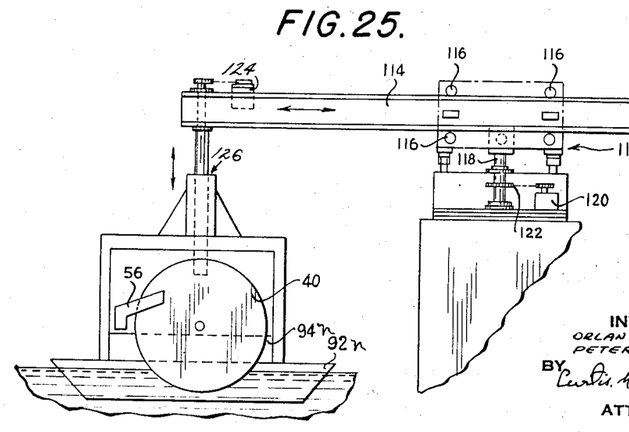
FIGURE 25 is a side elevation of another apparatus of the invention shown in its relation to mechanism for controlling its movement, operated from the edge of a reservoir, etc.

Still another apparatus embodying the invention is seen at FIGURE 25. Here hold tank 94$n$ is floated on pontoons 92$n$ and is movable backward and forward by the drive apparatus 112, seen at the right side of the figure. In this apparatus beam 114 is movable, on rollers 116, back and forth. It is also swingable on shaft 118, which is turned for this purpose by motor 120 acting through sprockets and chain 122. Furthermore, motor 124 on beam 114 drives screw 126 for lowering and raising disk 40, as desired.

FIGURE 26 shows another apparatus utilizing the present invention. Here a level sensing device, e.g., float switch 128 controls operating circuit 129 of motor 130, which drives winch 131 to wind or release cables 132 which run on sleeves rotatably attached to frame 134, and thereby to lift or lower disks 40 to a desired depth of immersion in the raw liquid.

Figure 27:
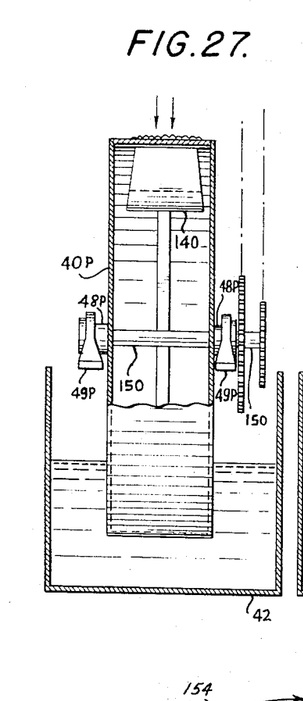
FIGURE 27 is a view partly in end elevation and partly in section of an apparatus embodying the invention and comprising a rotating magnet.
Figure 28:
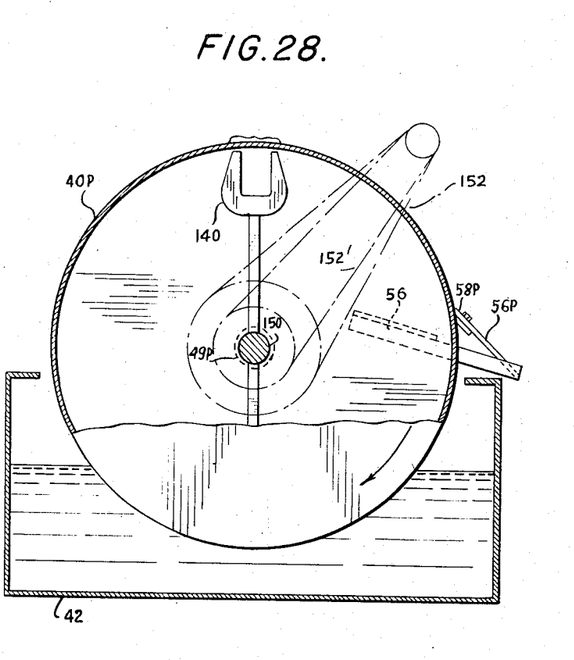
FIGURE 28 is a view of the apparatus of FIGURE 27 partly in side elevation and partly in section.
Figure 29:
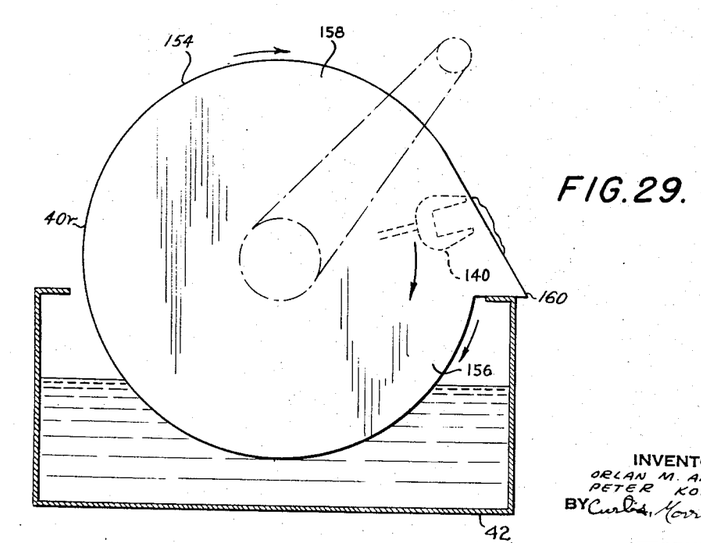
FIGURE 29 is a schematic elevation of a similar apparatus to that described by FIGURE 28 but in which the magnet housing is stationary.

FIGURES 27, 28 and 29 show especially useful apparatus which utilize the magnetic phenomena to remove paramagnetic impurities with oily waste liquids.

FIGURE 27 shows a magnet 140 rotatably mounted on shaft 150 within a rotatably mounted cylinder 40$p$ and concentrically telescoped in its tubular shaft 48$p$ and bearings 49$p$. Magnets 140 attract iron chips and the like to the circumferential surface of cylinder disk 40$p$. These chips are then scraped off as the disk rotates past scraper 58$p$. Magnet 140 and disk 40$p$ are separately driven respectively by sprocket chains 152 and 152' on shafts 150 and 49$p$, respectively, and thus each may be operated at whatever r.p.m. is found to be most advantageous for any given job.

The apparatus shown schematically in FIGURE 29 comprises a fixed and substantially cylindrical housing 154 and a rotatably mounted magnet 140 within it. In this the magnet, although for simplicity of drawing shown as a permanent horseshoe magnet, is preferably an electromagnet in which magnetism is electrically induced, but only in the 240° sector from 4 to 12 o'clock in its rotational cycle (indicated by reference numerals 156 and 158). Thus magnetic material in the raw liquid will be drawn to the surface of disk 40$p$ and will be released from electromagnetic forces at point 158 and allowed to slide down a chute section such as 60 from the lip 160 of housing 154.

The manner in which the liquid mixture approaches the surface of the rotating element may have a significant effect on the efficiency with which liquid separation is achieved. Thus, it is advantageous that the liquid approach the disk toward its peripheral edge (i.e., not from one side and normal to the disk diameter at the point of approach) because both sides of the disk should be exposed to the approach and neither allowed to be starved of raw liquid so that it would contribute little to the separation operation. With this consideration in mind, the apparatus will be arranged to feed the liquid more or less normal to the axis of the disk, and toward the edge of the disk, so as to avoid the aforementioned distribution problem.

When a number of liquid collecting disks are assembled so as to operate in series, it is usually desirable that the rotational speed decrease from the first to the last element. Thus, the first element may run at 100 r.p.m. in which case it will normally pick up a large quantity of water with any oil carried over, to take a most common industrial example. However, as the r.p.m. of succeeding disks diminish the water carry-over will also be diminished.

The speed of rotation of the disk, and the consequent centrifugal effect, should be sufficient to create and maintain a flow to and across the faces of the disks so that the particles to be adsorbed and separated from the mixture will be brought into contact with the adsorbing surface. On the other hand, the speed should not be so great that the adsorbed constituent is immediately thrown off by centrifugal force before it can accumulate into a substantial layer and be carried out of the mixture and be scraped into the trough for flow to a process step in which it is used or to storage or to waste, depending upon which constituent of the mixture is being separated and on the current need for such constituent.

In the examples given above, the surface of the rotor is oleophilic, and it dips into the upper stratum of the mixed liquid, where there is already some concentration of oil by gravity flotation. That is advantageous, but not essential to the invention; and, in fact, with the series operation, the mix in later steps of the series may be so concentrated as to oil that it may be better to use a hydrophilic surface on the disk and separate water from the oily mass. Especially in the case of particles attracted to the rotor by magnetic or electrostatic attraction and dragged around the exterior of the housing, as in FIGURES 27 to 29, the particulate material may be preferentially wet by one or another of the constituents of the mixture and thus may take on droplets of such constituent as they pass to the rotor.

As indicated above, various heating and cooling operations may also increase the efficiency of the apparatus of the invention when a number of separating elements are used in series. Whether this effect is due to changes in viscosity, mutual solubility, chemical change in any surface active agent present in the dirty mixture, or other consideration will vary from application to application. It is noted, however, that an increase in operating temperature has resulted in improving the selectivity of the apparatus when light machine oils are being removed from dirty aqueous mixtures. Temperatures have been successfully used up to the point where the vapor pressures of the liquids become inconveniently high.

Conventional heating methods such as submerged heating coils and radiant heating elements may be utilized.

As in any separation operation, the separation operation may be considered a separation and recovery of a minor constituent from a major constituent. It is believed that the cleaning aspects of this invention will have the widest commercial application; however, nothing in the description and claims herein is to be construed as negating usefulness of the claimed apparatus as a method for recovering minor constituents, e.g., cutting, or lubricating oils, for subsequent reuse.

The foregoing descriptive matter will suggest to those skilled in the art a large number of modifications which are encompassed by the invention although not specifically described herein.

For example, the degree of submergence of the liquid separating surface may be controlled or not as convenient; similarly, the principle of magnetic separation may be utilized or not as is convenient for the specific application. A variety of devices, including all of those disclosed in copending application Ser. No. 367,437, filed May 14, 1964, may be used in removing the adsorbed liquid from the liquid adsorbing surfaces.

We claim:

1. Apparatus for separating a liquid from a mixture comprising a plurality of rotatably mounted disks, each having a selectively adsorbent surface in respect to at least one constituent liquid in said mixture, a reservoir for each disk adapted to hold a body of a liquid mixture so as to submerge a substantial fraction of said adsorbent surface, means for collecting and transporting, adhering liquid from each disk, said disks being serially arranged so that the liquid adhering to each disk in its reservoir is transferred thereby into another reservoir wherein it is further separated by selective adherence to another partially submerged disk therein and wherein at least one of said disks is of opposing adsorbent selectivity from the preceding serially arranged disk, wherein the constituent of liquid mixtures selectively adherent to said preceding disk is a major constituent in the reservoir for said preceding disk and the same constituent is a minor constituent in the reservoir for the disk having opposing adsorbent selectivity.

2. Apparatus as defined in claim 1 wherein the face of at least one said disks has a dielectric constant of up to about 5.

3. Apparatus as defined in claim 1 wherein at least one of said disks is steel.

4. Apparatus as defined in claim 1 wherein at least one said disks is provided internally with means for heat exchange.

5. Apparatus as defined in claim 1 wherein the disks comprise a polar material at the surface adapted to attract said constituent to be separated from the mixture.

6. Apparatus as defined in claim 1 further comprising within said disks a rotatably mounted magnet adapted to attract paramagnetic particles to said disks and means for removing said particles from said disks.

7. An apparatus as defined in claim 6 comprising means for substantially reducing the magnetic action over said magnetic particles during a portion of the rotational cycle of the magnet.

8. An apparatus as defined in claim 6 comprising means for eliminating the magnetic action over said magnetic particles during a portion of rotational cycle of the magnet.

9. An apparatus as defined in claim 1 which further includes polarized means behind the preferentially adsorbing surface adapted to attract polar particles to said surface.

10. Apparatus as defined by claim 9 in which the polarized means is magnetic.

11. Apparatus as defined by claim 9 in which the polarized means is an electret.

12. Apparatus as defined in claim 1 which further comprises means for propelling the mixture toward both sides of said disks.

13. Apparatus as defined in claim 1 in which the immersion of the disks is at least about one third their radius.

14. Apparatus as defined in claim 1 wherein the serially arranged plurality of disks each operate at a slower rotational speed than the preceding disk whereby the selectively non-adherent constituent carryover is diminished.

References Cited

UNITED STATES PATENTS

| 3,146,192 | 8/1964 | McClintock | 210—525 X |
| 3,245,539 | 4/1966 | Earle | 210—523 X |

REUBEN FRIEDMAN, *Primary Examiner.*

J. L. DE CESARE, *Assistant Examiner.*